United States Patent
Petrou

(10) Patent No.: US 8,659,433 B2
(45) Date of Patent: Feb. 25, 2014

(54) LOCKING MECHANISM BASED ON UNNATURAL MOVEMENT OF HEAD-MOUNTED DISPLAY

(75) Inventor: David Petrou, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/529,959

(22) Filed: Jun. 21, 2012

(65) Prior Publication Data

US 2013/0069787 A1    Mar. 21, 2013

Related U.S. Application Data

(63) Continuation of application No. 13/239,231, filed on Sep. 21, 2011, now Pat. No. 8,223,024.

(51) Int. Cl.
*G08B 23/00*    (2006.01)

(52) U.S. Cl.
USPC ............... 340/573.1; 340/573.7; 340/539.13; 345/8

(58) Field of Classification Search
USPC ............... 340/573.1, 425.5, 42, 426.26, 432, 340/573.7, 539.13, 539.23, 561, 562; 345/156, 8; 368/250
See application file for complete search history.

(56) References Cited

U.S. PATENT DOCUMENTS

| | | | |
|---|---|---|---|
| 5,742,264 A | 4/1998 | Inagaki et al. | |
| 5,900,849 A | 5/1999 | Gallery | |
| 5,991,085 A | 11/1999 | Rallison et al. | |
| 7,148,860 B2 | 12/2006 | Kooi et al. | |
| 7,432,879 B2 | 10/2008 | Schonlau et al. | |
| 7,866,818 B2 | 1/2011 | Schroeder et al. | |
| 2004/0070499 A1* | 4/2004 | Sawinski | 340/568.1 |
| 2005/0249049 A1* | 11/2005 | Jarrett et al. | 368/250 |
| 2009/0243970 A1 | 10/2009 | Kato et al. | |
| 2010/0013739 A1 | 1/2010 | Sako et al. | |
| 2010/0079508 A1* | 4/2010 | Hodge et al. | 345/697 |
| 2010/0103077 A1 | 4/2010 | Sugiyama et al. | |

(Continued)

FOREIGN PATENT DOCUMENTS

| | | |
|---|---|---|
| EP | 1329127 B1 | 7/2003 |
| EP | 2211224 A1 | 7/2010 |
| WO | 2011044680 A1 | 4/2011 |
| WO | 2011058584 A1 | 5/2011 |

OTHER PUBLICATIONS

Bhatnagar, "Position trackers for Head Mounted Display systems: A survey," Mar. 29, 1993, Retrieved from URL [http://wwwx.cs.unc.edu/~lastra/Courses/COMP006_F2001/Notes/1993_Bhatnagar_Tracking.pdf], Retrieved on Jul. 20, 2011.

(Continued)

*Primary Examiner* — Hoi Lau
(74) *Attorney, Agent, or Firm* — McDonnell Boehnen Hulbert & Berghoff LLP

(57) ABSTRACT

A wearable computer determines unnatural movements of a head-mounted display (HMD) and triggers a locking mechanism. In one embodiment, the wearable computer receives movement data from one or more sensors and determines that the movement of the HMD is unnatural. In one embodiment, the wearable computer receives movement data from one or more sensors and determines that the HMD is being worn by an unauthorized user. In response to determining an unnatural movement and/or an unauthorized user wearing the HMD, the wearable computer triggers a locking mechanism, which can beneficially provide security measures for the wearable computer.

21 Claims, 9 Drawing Sheets

(56) References Cited

U.S. PATENT DOCUMENTS

| | | |
|---|---|---|
| 2010/0138798 A1 | 6/2010 | Wilson et al. |
| 2010/0167783 A1* | 7/2010 | Alameh et al. ............. 455/556.1 |
| 2010/0216429 A1* | 8/2010 | Mahajan ....................... 455/411 |
| 2010/0259471 A1 | 10/2010 | Seiji et al. |
| 2010/0308999 A1* | 12/2010 | Chornenky ................ 340/573.1 |
| 2011/0117970 A1 | 5/2011 | Choi |
| 2011/0128223 A1 | 6/2011 | Lashina et al. |

OTHER PUBLICATIONS

Lin et al., "A novel device for head gesture measurement system in combination with eye-controlled human—machine interface," Optics and Lasers in Engineering, vol. 44, Issue 6, Jun. 2006, pp. 597-614 Retrieved from URL [http://www.sciencedirect.com/science/article/pii/S0143816605001132] Retrieved on Jul. 21, 2011.

* cited by examiner

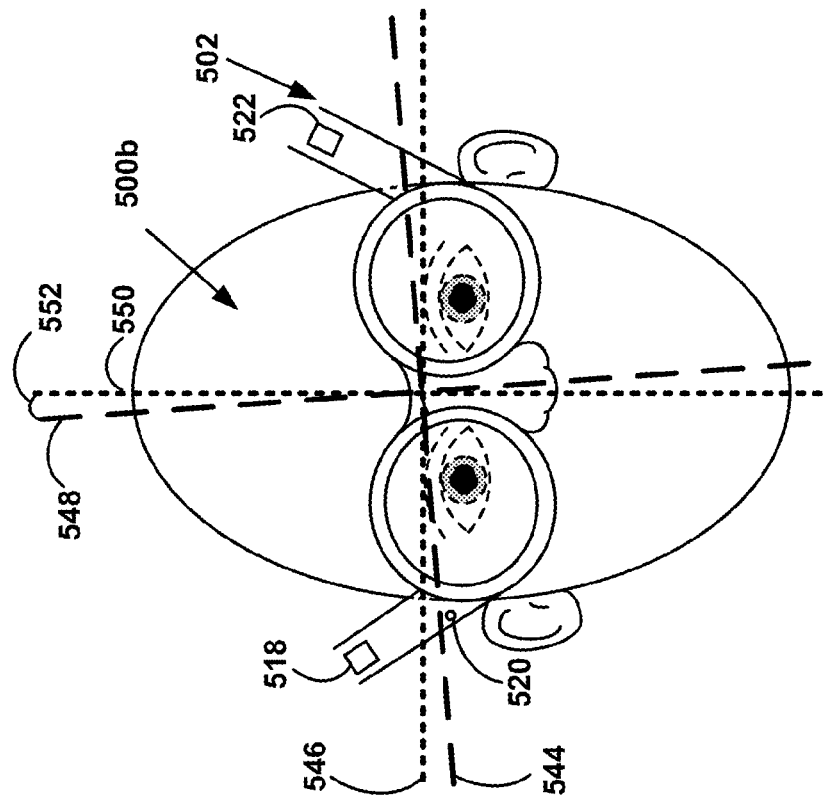
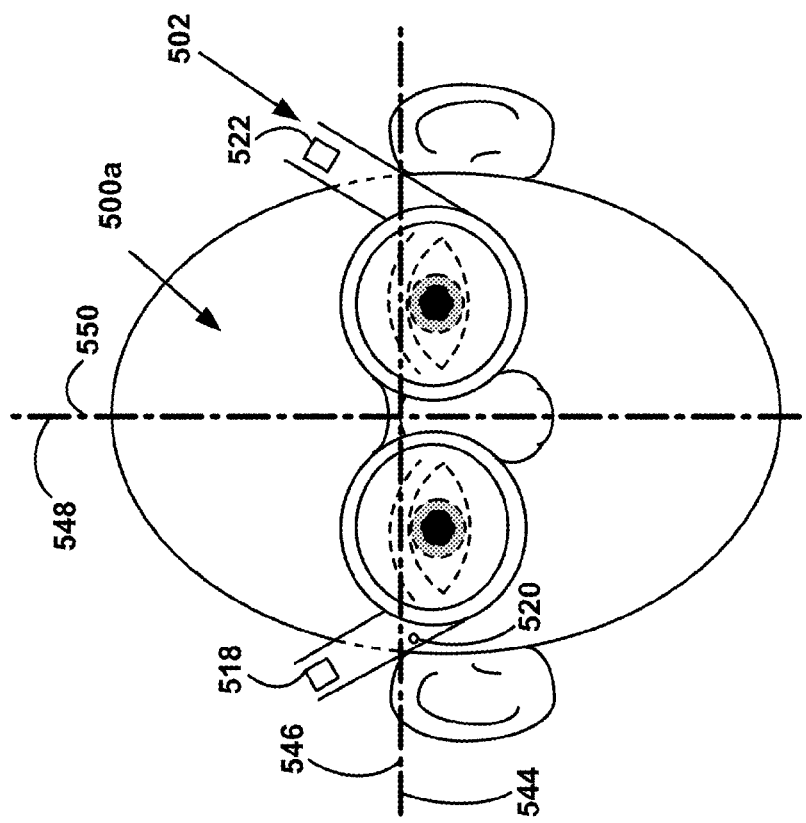

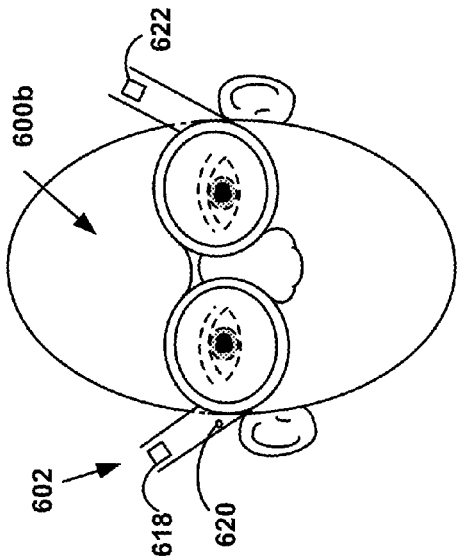
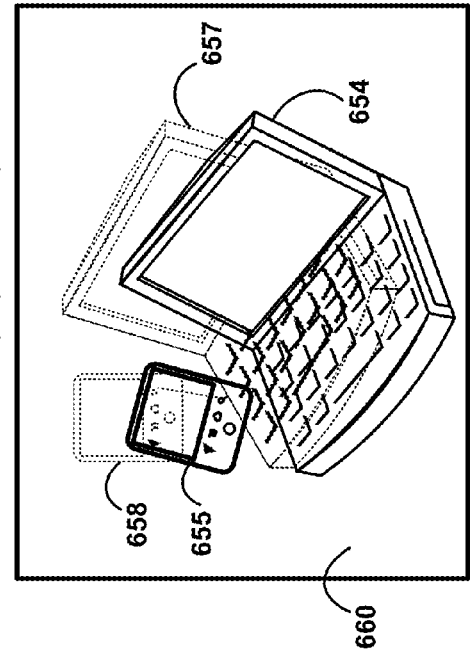
FIGURE 6a
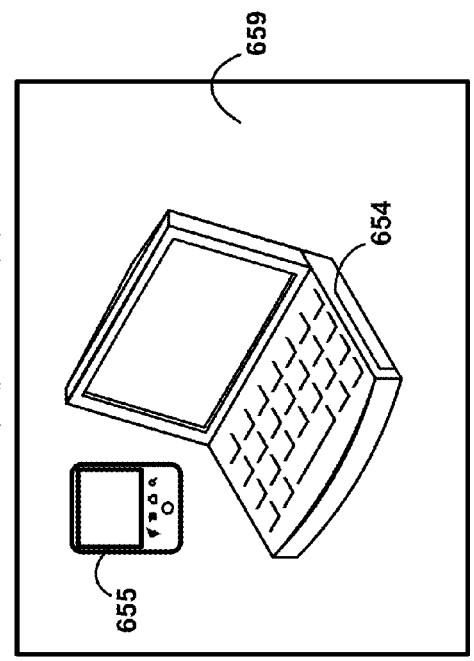
FIGURE 6b

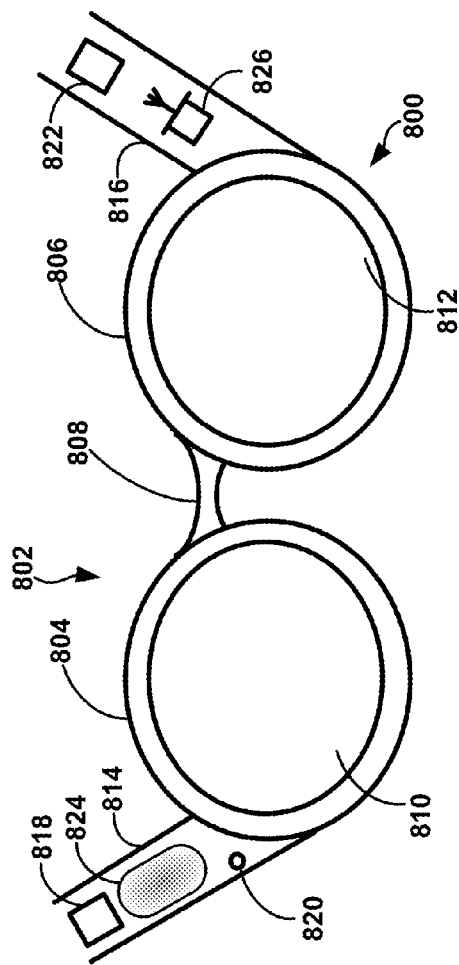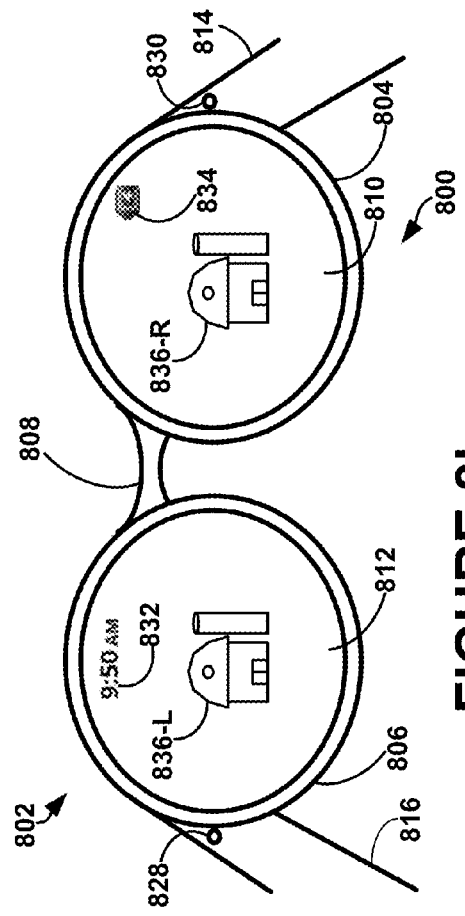
FIGURE 8a
FIGURE 8b

LOCKING MECHANISM BASED ON UNNATURAL MOVEMENT OF HEAD-MOUNTED DISPLAY

RELATED APPLICATION

This application claims priority to U.S. patent application Ser. No. 13/239,231 filed Sep. 21, 2011, entitled "Locking Mechanism Based on Unnatural Movement of Head-Mounted Display", the contents of which are incorporated by reference herein for all purposes.

BACKGROUND

Unless otherwise indicated herein, the materials described in this section are not prior art to the claims in this application and are not admitted to be prior art by inclusion in this section.

Numerous technologies can be utilized to display information to a user of a system. Some systems for displaying information may utilize "heads-up" displays. A heads-up display is typically positioned near the user's eyes to allow the user to view displayed images or information. One type of heads-up display includes a head-mounted display (HMD). A head-mounted display can be incorporated into a pair of glasses, a helmet, or any other item that the user wears on his or her head.

A user may desire the same functionality from an HMD as the user has with various other systems, such as computers and cellular phones. For example, the user may want to have an authentication mechanism for the HMD, such as a password to lock and/or unlock the device.

SUMMARY

In one aspect, a computer-implemented method is provided. The method involves: (a) receiving movement data from at least one sensor of a head-mounted display (HMD), wherein the movement data corresponds to movement of the HMD; (b) determining that the movement data corresponds to a movement profile, wherein the movement profile is characteristic of an unintentional removal of the HMD from a wearer; and (c) in response to determining that the movement data corresponds to the movement profile, initiating a security action.

In another aspect, a wearable-computing system is provided. The wearable-computing system includes a non-transitory computer-readable medium and program instructions stored on the non-transitory computer-readable medium and executable by at least one processor to: (a) receive movement data from at least one sensor of a head-mounted display (HMD), wherein the movement data corresponds to movement of the HMD; (b) determine that the movement data corresponds to a movement profile, wherein the movement profile is characteristic of an unintentional removal of the HMD from a wearer; and (c) in response to determining that the movement data corresponds to the movement profile, initiate a security action.

In yet another aspect, disclosed herein is a non-transitory computer readable medium having stored therein instructions executable by a client computing device to cause the client computing device to perform functions comprising: (a) receiving movement data from at least one sensor of a head-mounted display (HMD), wherein the movement data corresponds to movement of the HMD; (b) determining that the movement data corresponds to a movement profile, wherein the movement profile is characteristic of an unintentional removal of the HMD from a wearer; and (c) in response to determining that the movement data corresponds to the movement profile, initiating a security action.

In another aspect, a computer-implemented method is provided. The method involves: (a) receiving positioning data from at least one sensor of a head-mounted display (HMD), wherein the positioning data is indicative of a position of the HMD; (b) determining that the positioning data corresponds to a position profile, wherein the position profile is characteristic of the HMD being worn by an unauthorized user; and (c) in response to determining that the position data corresponds to the position profile, initiating a security action.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 5a and 5b illustrate the HMD being worn by an unauthorized user, according to exemplary implementations.

FIGS. 6a and 6b illustrate the HMD being worn by an unauthorized user relative to physical objects, according to exemplary implementations.

FIGS. 8a and 8b illustrate a wearable computing device that functions as a head-mounted display, according to exemplary implementations.

DETAILED DESCRIPTION

Figure 1:
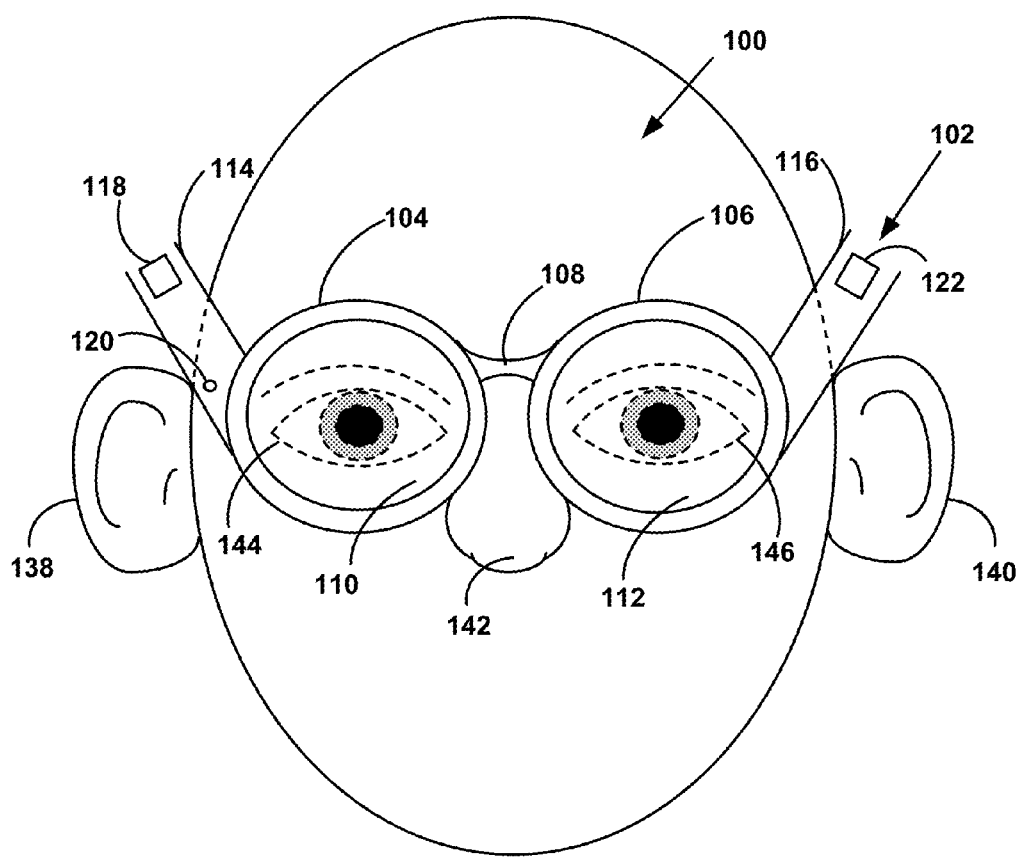
FIG. 1 illustrates a head-mounted display, according to an exemplary implementation.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

A. Overview

Authentication mechanisms to lock and/or unlock devices are generally prevalent amongst computing devices. Some authentication mechanisms may involve knowledge factors such as usernames, passwords, pass phrases, personal identification numbers, and other possible validating techniques.

Other authentication mechanisms may involve traits that uniquely identify a user. For example, a device may unlock after validating an authorized user through fingerprint scanning, retinal pattern recognition, DNA sequences, and/or through other such biometric identifiers.

The above-mentioned mechanisms are effective for authenticating users and protecting information after a device has been locked. However, many devices only lock after a certain period of inactivity (e.g., two minutes), or if a user manually locks the device. Due to the relative simplicity of such an auto-lock feature (e.g., doing nothing), many users choose not to manually lock their devices, and instead rely on the auto-lock feature. In this scenario, there may be a window in time after the user ceases to use the device and before the device locks automatically. This may leave a device unprotected for a given period of time.

If a device is removed from a user in an undesired manner when it is unlocked (e.g., by a thief), then it is unlikely that the user will have time to lock their device, which may leave the device unprotected. However, it is likely that a user will want to protect information when a device is removed in an unintended manner. Accordingly, exemplary methods and systems may involve the recognition of unnatural movements and/or unnatural positions of the device, which are unlikely to be intended by the user. Upon this recognition, the device may responsively initiate an action to restrict access to the device and/or information stored thereon, such as locking the device.

In particular, exemplary methods and systems may protect information by determining when the movement of the device matches a predetermined movement profile that is indicative of an unnatural movement of a device occurs and/or a predetermined position profile that is indicative of a device resting in an unnatural position (e.g., a position that is characteristic of use, but is not characteristic of use by the device's owner). When such an unnatural movement and/or a movement characteristic of unnatural position is detected, the device may responsively initiate, e.g., a locking action.

In an exemplary embodiment, a wearable computer that includes a head-mounted display (HMD) may implement a locking mechanism based on an unnatural movement and/or a movement characteristic of an unnatural position. In such an embodiment, the HMD could take the form of or include eyeglasses that may be worn by a person, and in particular, by an authorized user of the HMD. Since eyeglasses are typically designed to securely fit a user's face, the eyeglasses may closely follow the movements of the user. In some embodiments, the HMD may be configured to receive data regarding the user's movements and determine whether any movements are unnatural. To receive such data, the HMD may include or have access to movement sensors. The HMD may therefore analyze the movement data in order to determine when an unnatural movement occurs. For example, consider a scenario where a user is wearing the HMD when suddenly, the HMD is yanked off a user's head. The sensors within the HMD may therefore provide movement data that is indicative of the abrupt movement. In particular, the HMD may include accelerometers configured to detect the force associated with the acceleration of the yanking movement and determine the unnatural movement. Accordingly, the wearable computer may take actions to prevent use of the device, such as locking itself, setting off an alarm, and/or reporting a possible theft to the owner.

In an exemplary embodiment a wearable computer that includes a head-mounted display (HMD) may additionally or alternatively implement a locking mechanism based on an unnatural positioning. For example, in an embodiment where the HMD takes the form of glasses, there may be a position profile that includes certain positioning indicators that are associated with how the HMD fits on an authorized user. Such positioning indicators may include the angle at which the HMD sit on the user's head, the pressure exerted against nose pads of the HMD by the user's face, various locations where the user's features contact the HMD, and so on. Accordingly, the HMD may include positioning sensors that provide positioning indicators. The HMD may therefore analyze the positioning indicators in order to determine when the HMD is in an unnatural position and responsively lock the HMD.

In some embodiments, an HMD may analyze both a movement profile and a position profile when determining whether to lock. For example, if a user is getting too many false positives based on an unnatural movement analysis alone (e.g., the device locking when the user does not want it to), the device may provide a setting to require that both an unnatural movement and an unnatural position indicators be detected, before locking automatically. For instance, consider a camera adjoined to or embedded within the HMD. Referring back to the example above, the camera may obtain a video of the user's face during the removal of the HMD to determine an unnatural movement (possibly capturing footage of the HMD being taken off the user.) Then, once the unnatural movement is detected, the wearable computer may monitor positioning indicators for unnatural positioning.

In response to detecting an unnatural movement and/or an unnatural position, the wearable computer may quickly initiate a security action, such as locking The security action may prevent access to information in the glasses by disabling the functionality of the HMD such that no information can be viewed or obtained by anyone other than the user. In some embodiments, the HMD may also trigger an action to inform others that the locking mechanism has been initiated. For instance, an HMD may sound an alarm and/or flash lights to alert people in the proximity of the device that the HMD is unintentionally removed from the user, or alert authorities such as the police, authorized wearers of the HMD, and/or a private security services.

B. Exemplary Wearable Computer

FIG. 1 is an illustration of a wearable computer, according to an exemplary embodiment. In this example, the wearable computer 102 takes on an eyeglass form. Further, the HMD 102 is worn by a user 100. HMD 102 includes lens-frames 104 and 106, a center frame support 108, lens elements 110 and 112, and extending side-arms 114 and 116. Lens elements 110 and 112 are configured to be positioned in front of the user's eyes 144 and 146, respectively. The center frame support 108 is configured to rest the HMD 100 on the user's nose 142. The extending side-arms 114 and 116 are configured to secure the HMD 102 to a user's face via user's ears 138 and 140, respectively. The extending side-arms 114 and 116 may further secure the HMD 102 to the user by extending around a rear portion of the user's head. Additionally or alternatively, the wearable computing system 100 may be connected to or be integral to a head-mounted helmet structure. Other possibilities exist as well.

The sensors 118 and 122 are shown mounted on the extending side-arms 114 and 116, respectively. However, the sensors 118 and 122 may be provided on other parts of the eyeglasses 102. Although depicted as single components, the sensors 118 and 122 could include more than one type of sensor device or element. By way of example and without limitation, the sensors 118 and 122 could be any one or more of a motion detector (e.g., a gyroscope, an accelerometer, a camera, and/or a shock sensor), an impact sensor, a contact sensor (e.g., capacitive sensing device), a location determination device (e.g., a GPS device), a magnetometer, and an orientation sensor (e.g., a theodolite). Other sensing devices or elements may be included within the sensors 118 and 122 and other sensing functions may be performed by the sensors 118 and 122.

Camera 120 is shown to be positioned on the extending side-arm 114 of the HMD 102; however, the camera 120, or other similar cameras, may be provided on other parts of the HMD 102. The camera 120 may be configured to capture images at various resolutions or at different frame rates. In addition, camera 120 may also be a video camera directed to capture images or videos of the wearer. Many video cameras with a small form factor, such as those used in cell phones or webcams, for example, may be incorporated into an example of the wearable system 100. Although FIG. 1 illustrates one camera 120, more video cameras may be used, and each may be configured to capture the same view, or to capture different views to obtain information corresponding to the positioning of the glasses 102. For example, the video camera 120 may be forward facing to capture at least a portion of the real-world view perceived by the user. This forward facing image captured by the video camera 120 may then be used to determine the positioning of glasses 102 with respect to the physical environment.

C. Exemplary Method for Detecting Unnatural Movements

Figure 2:
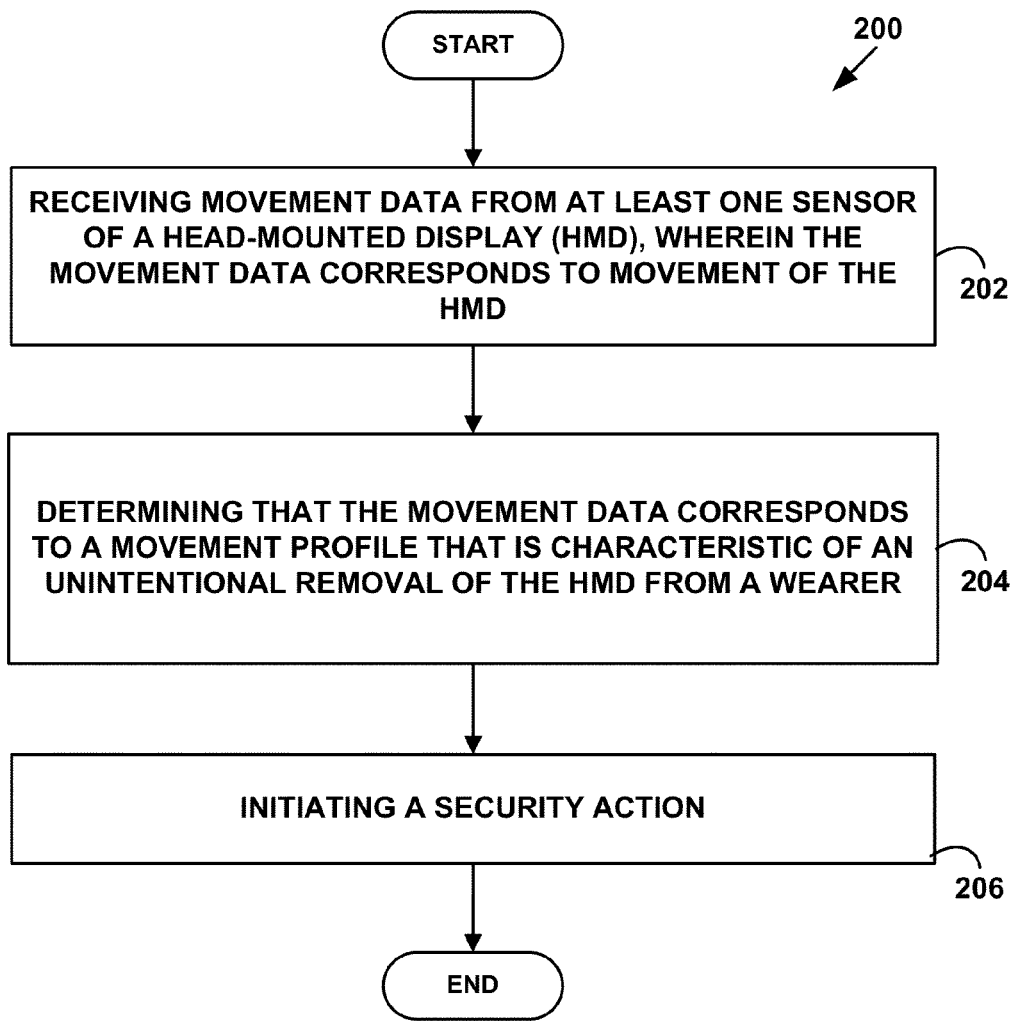
FIG. 2 is a flow chart illustrating a method for initiating an action corresponding to an unnatural motion, according to an exemplary implementation.

FIG. 2 is a flow chart illustrating an exemplary method 200. Although method 200 may be carried out by any number of computing devices or systems, method 200 is described by way of example as being carried out by a wearable computer, and in particular, by a wearable computer that includes or takes the form of an HMD.

As shown in block 202, method 200 involves a wearable computer receiving movement data, which corresponds to movement of the HMD, from at least one sensor of an HMD. The wearable computer then determines that the movement data corresponds to a movement profile that is characteristic of unintentional removal of the HMD (e.g., that is characteristic of an unnatural movement of the HMD), as shown by block 204. In response, the wearable computer initiates a security action that corresponds to the movement profile, as shown by block 206.

i. Receiving Movement Data

As indicated by block 202, exemplary method 200 involves receiving movement data from at least one sensor of an HMD. Further, the movement data may correspond to various movements of the HMD. In some embodiments, one or more of the sensors that receive movement data may include gyroscopes, accelerometers, cameras, shock sensors, contact sensors (e.g., capacitive sensing devices), impact sensors, location determination devices (e.g., a GPS device), magnetometers, compasses, sonar devices, and orientation sensors (e.g., a theodolite). These sensors may be configured to obtain various types of information regarding the movement of the HMD. In some embodiments, one or more of these sensors may obtain information corresponding to velocity, angular velocity, and/or acceleration of the HMD. Further, one or more of the sensors may obtain information regarding the direction the HMD is facing, moving, and/or any changes in direction of the HMD's movement.

ii. Initiating an Action Upon Determining an Unnatural Movement

As indicated by block 206, exemplary method 200 involves initiating a responsive action when an unnatural movement is detected such that the action secures the HMD. In an exemplary embodiment, the action may simply be locking the device, such that a password is required before use of the device can resume. In some embodiments, when an unnatural movement is detected, the HMD may go beyond simply locking the device, and prevent access or use of the information within the HMD. For example, the HMD may initiate a data encryption process to secure information until the HMD is returned to the authorized user. In some embodiments, the HMD may initiate more drastic actions such as erasing data and/or memory, or even cause itself to self-destruct. Many other possibilities may exist.

In some embodiments, the initiated action may vary based on the degree of unnatural movement that is detected. For example, when movements are determined to be slightly unnatural (e.g., slightly exceeding a threshold), a simple authentication mechanism may be required to unlock the device. For instance, if the user repeatedly moves their head due to having the hiccups, the recurring movements may slightly exceed a single threshold and cause the HMD to initiate a trivial action such as locking the HMD. The locking may require that a user be authenticated through a login before the HMD unlocks itself. For example, the HMD may authenticate the user via use of one or more passwords, pass codes, verification questions, and/or personal identification numbers. Other possible authentication methods include, but are not limited to, include fingerprint recognition and/or iris, retinal, and/or pupil scanning.

However, when movements are more unnatural, or in other words, when movements provide a stronger indication that measures are necessary to secure the device (e.g., in the case of theft or attempted theft of the HMD), a more secure authentication mechanism may be required to unlock the device. For example, a more secure authentication mechanism may be required when a device detects drastic movements that likely resulted from the HMD being yanked off the wearer. As a specific example, a more secure authentication mechanism may be required when the acceleration and/or the angular velocity greatly exceeds a threshold or exceeds a higher threshold) and/or when multiple changes in the direction of the HMD occur in a short period of time.

In such embodiments, an authentication mechanism may employ various techniques to provide additional security. For example, the HMD may sound an alarm. Further, the HMD may initiate communication to various groups and/or individuals. For example, the HMD may notify proper authorities such as police officers, security personnel of a potential theft of the HMD, or even other authorized wearers of the HMD (since there may be more than one authorized wearer of the HMD.) Further, the HMD may initiate a GPS tracking module in the HMD such that proper authorities, including authorized users, can track the location of the HMD through a personal computing device (i.e. cell phone, laptop, and/or a tablet computer.) Configured as such, a user, service provider, law enforcement agency, and/or others may be able to locate a lost or stolen HMD. Further, the HMD may require a responsive communication before unlocking the device. For instance, the HMD may send an e-mail with a passcode to an e-mail account associated with the authorized user of the HMD. The HMD may then require this passcode be entered before unlocking the device.

Further, in some embodiments, a police control center or another authority may be notified when an unnatural movement is detected. In such an embodiment, the control center may initiate a transfer of information from the HMD to the control center and/or to a secure network storage location. Such a control center may be able to take various responsive actions and/or may provide an owner of the HMD, a service provider, a law enforcement agency and/or others with the option to take various responsive actions. For example, the control center may erase information on the HMD or provide a user with the option to do so (e.g., via a website, e-mail, or phone call). As another example, the control center may activate a camera adjoined to the HMD to see the real-world view of the HMD and determine its location and/or the person(s) possessing the HMD.

In some embodiments, the more drastic actions may be initiated by the HMD regardless of the degree of the unnatural movement. In particular, such drastic actions may be initiated regularly as a matter of engineering design choice. For example, a user may have extremely valuable information in the HMD such that the user may want to have the highest precautionary measures for detecting unnatural movements and initiate actions to secure the information. The HMD may be programmed to detect the slightest unnatural movements and responsively lock itself, sound an alarm, notify the police, and disable the HMD.

iii. Determining Unnatural Movements

As indicated by block 204, exemplary method 200 involves determining that the movement data includes data corresponding to an unnatural movement of the HMD. In some instances, an unnatural movement may be indicated by a predetermined movement profile characteristic of an unintentional removal of the HMD from the wearer. Yet further, a removal of the HMD may be a physical separation between the HMD and the wearer such that the removal is unintended by the wearer. For example, an unintentional removal of the HMD may be caused by another person, an animal, inertia (e.g., being in a car during a car accident), and/or an object (e.g., a golf ball), which completely knocks the HMD off of the wearer's face, or caused by something else altogether. Further, in certain scenarios, it is also possible that a wearer could unintentionally cause their HMD to be removed. For example, the HMD could be jarred loose and fall off the wearer when the wearer inadvertently runs into a physical object. Other examples are also possible.

In an exemplary embodiment, an HMD analyzes the movement data received in block 202 to detect when an unnatural movement occurs. For example, the HMD may analyze a movement profile that includes velocity data, angular-velocity data, and/or acceleration data for the HMD in order to determine when an unnatural movement occurs. Further, the information regarding the direction the HMD is facing, the direction the HMD is moving (perhaps across different axes,) or information indicating any change in direction of the HMD's movement and/or the number of changes in direction of the HMD may also be used determine an unnatural movement.

In some embodiments, an HMD may analyze a number of different types of movement data to determine when an unnatural movement occurs. For example, determining an unnatural movement may involve an analysis of both the acceleration and the direction of a movement. More generally, the HMD may analyze various combinations of velocity data, angular-velocity data, directional data indicating the direction the HMD is facing and/or moving, and/or data indicating any change in direction of the HMD across different axes, in order to determine when an unnatural movement occurs. Further, it is also possible that a single type of movement data may be analyzed separately to determine when an unnatural movement occurs.

In some embodiments, determining an unnatural movement from a particular set of movement data may make it unnecessary to analyze other movement data. For example, consider a scenario where a user is wearing the HMD while driving a car. Suddenly, an object appears in front of the car and the user is forced to slam on the breaks, causing the car to come to an abrupt stop. As a result, the inertia causes the HMD to fall off the user, causing it to lose physical contact with the user. The sensors within the HMD may provide movement data that is indicative of the sudden change in velocity of the HMD. The data corresponding to the sudden change in velocity (e.g., going from 30 mph to 0 mph in a matter of seconds) may solely indicate an unnatural movement without having to analyze any other movement data at all. Accordingly, the wearable computer may take actions to prevent unauthorized use of the device, such as locking itself.

In some embodiments, an HMD may analyze a combination of different types of movement data to determine an unnatural movement. For example, consider again the scenario above where the user is wearing the HMD while driving a car and the user is forced to slam on the breaks. Rather than the change in velocity (i.e. the deceleration from 30 mph to 0 mph) solely indicating an unnatural movement, the HMD may also include a contact sensor to detect an unnatural movement. The contact sensor may be comprised of a mixed signal programmable device to provide capacitance-based touch sensing and detect the proximity of the user with respect to the HMD. In particular, some embodiments may include a contact sensor that detects a loss of physical proximity between the user and the HMD. Further, some embodiments may utilize resistive sensing, surface acoustic wave technology, infrared photo detection, dispersive signal technology, and/or optical imaging to detect the proximity of the user with respect to the HMD. In response to detecting the deceleration and the distant proximity of the user, the HMD may initiate a security mechanism to protect the HMD.

In some embodiments, different combinations of movement data may be possible to indicate unnatural movements. For example, consider the previous example where the HMD detects the deceleration and the distant proximity of the user to determine an unnatural movement. However, instead of the contact sensor, the HMD may include an impact sensor to obtain information corresponding to the movement of the HMD. The impact sensor may be configured to determine an angle of deceleration, a direction of an impact, the force of the abrupt stop or crash, and/or any pressure that is applied to the HMD due to inertia. In response to determining the deceleration and the force of the abrupt stop, the HMD may trigger a security mechanism to protect information in the HMD.

In some embodiments, determining unnatural movements may involve comparing the movement data received in block 202 with respective thresholds. Thresholds may be pre-defined such that exceeding a threshold is indicative of unnatural movement. Further, thresholds may be defined around typical head movements and/or gestures such as a nod or shaking one's head. For example, a user of an HMD may nod to gesture affirmatively and the movement associated with a nod may be indicative of a natural movement. However, a threshold may be pre-defined such that a hard nod (hard enough to remove the HMD from the user's face) would indicate an unnatural movement. Accordingly, if movement data indicates a movement with enough velocity or acceleration to remove the HMD from the user's face, the HMD may take actions to lock itself.

In some embodiments, thresholds may be used to determine unnatural movements based on a user-profile specifically designed for a user. The user-profile may include various characteristics of movements that are unique to the user and numerous thresholds to determine unnatural movements. For example, consider the "hard nod" example above but where the user attaches an apparatus to the HMD such that extending side-arms of the HMD secure the HMD to the user by extending around a rear portion of the user's head. The hard nod (in the previous example) may no longer be a movement that would remove the HMD from the user. Therefore, this user may update their user-profile such that a hard nod is no longer an unnatural movement. However, the user-profile may include separate threshold such that an upward movement of the HMD with respect to the user which may be indicative of an unnatural movement. Numerous other thresholds may be included in the user-profile to determine unnatural movements.

In some embodiments, the user may adjust thresholds such that removing the HMD from the user's face (and possibly placing the HMD in the user's pocket) is a natural movement. Even though the removal of the HMD may be recognized, it may further be determined that the HMD is still in the user's possession (or perhaps in the proximity of the user.) For example, a capacitance-based touch sensor in the HMD may indicate that a close physical proximity with the user is sustained. Consequently, the HMD may not initiate a locking mechanism.

In some embodiments, the user may disable all the thresholds such that the HMD may be physically separated from the user without initiating a security mechanism. In particular, the user may preconfigure the HMD to disable all thresholds for a period of time. For example, the user may disable all the thresholds in the HMD for a 10-minute time period while the user is taking a shower. Before the 10-minute time period lapses, the user may have to put the HMD back on the user's face in order to prevent the HMD from initiating a security mechanism to protect itself.

In some embodiments, the HMD could take the form of or include eyeglasses designed to securely fit an authorized user's face and closely follow the slightest movements of the authorized user. Furthermore, sensors included in the HMD may have varying levels of sensitivity to detect a range of the HMD's movements. For example, the HMD may include sensors which may be highly sensitive to detect natural movements of a user's head while the user is simply wearing the HMD. The sensors may also capture patterns of natural movements of the user's head which may correspond to the user's vital characteristics (perhaps related to the user's breathing patterns and/or patterns of a user's natural tremor.) In some embodiments, natural movements and/or patterns of natural movements of the user's head may be unique to every wearer. Further, natural movements and/or patterns of natural movements of the user's head may be difficult to replicate, and thus may provide a "head-movement fingerprint" that helps identify the authorized owner of an HMD. In some embodiments, the head-movement fingerprint may be monitored with other physiological indicators and/or biometric data (possibly using biometric sensors such as pulse sensors to detect patterns of a user's pulse.)

In some embodiments, the HMD may be configured to receive movement data based on the user speaking, walking, and/or eating while wearing the HMD. However, data related to other day-to-day activities may also be received. Similar to the natural movements and/or patterns of natural movements described above, movements of the HMD while the user is speaking, walking, and/or eating may also be unique to each user to provide a head-movement fingerprint. Further, such a head-movement fingerprint may be provided in a user-profile. For example, the head movements of a user while the user is speaking may be unique to this particular user due to the shape of a user's head and/or jaw structure, body language, and personality (possibly related to a user's expressions.) Similar to other uses of the head-movement fingerprint, a locking mechanism may be implemented based when movements of the HMD do not correspond with head movement fingerprint of the owner's user-profile. In addition, physiological indicators and/or data obtained from biometric sensors may be used in conjunction with the head-movement fingerprint provided in the user-profile to help distinguish an authorized user from an unauthorized user.

Figure 3:
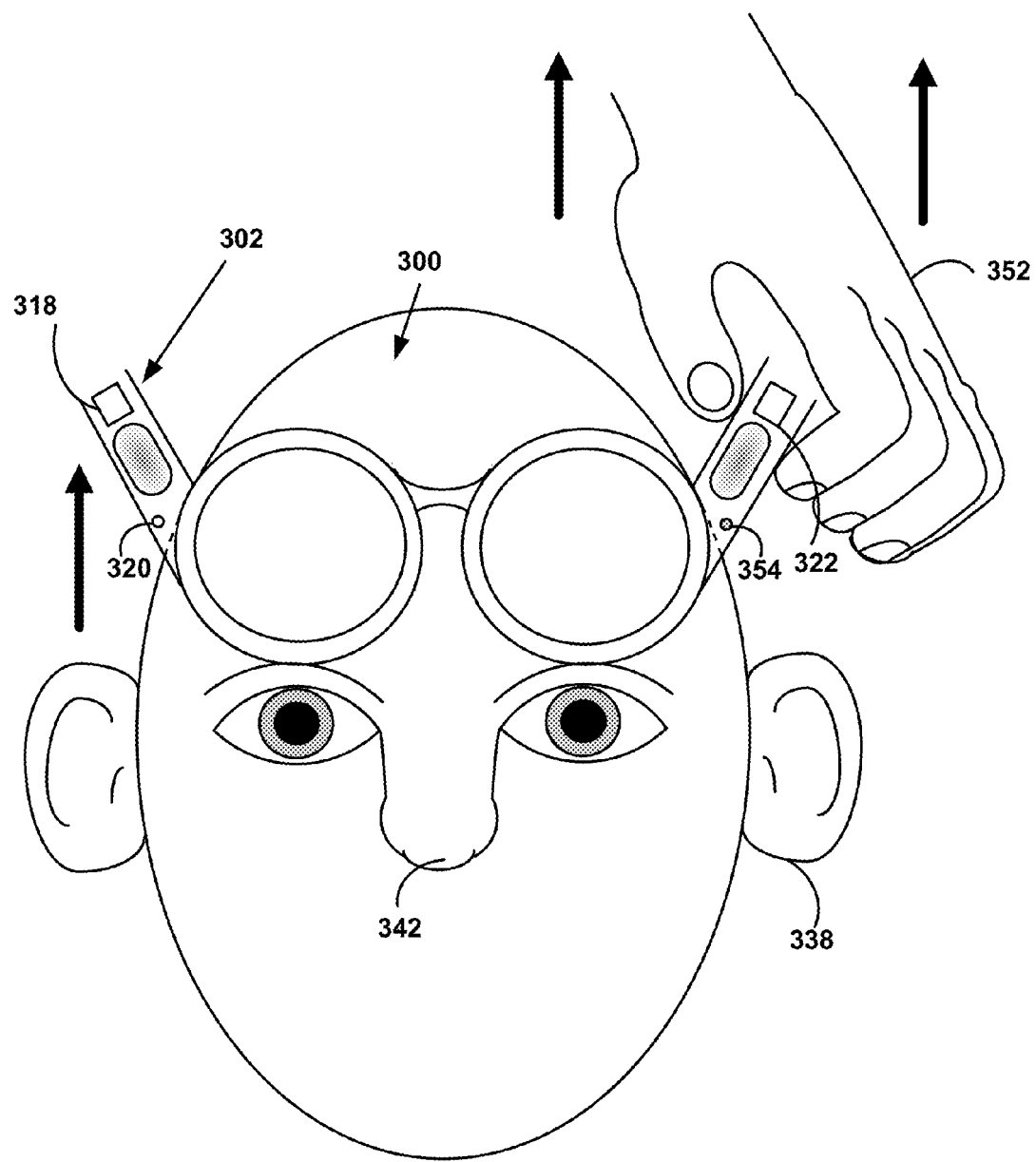
FIG. 3 illustrates an unnatural movement of an HMD, according to an exemplary implementation.

FIG. 3 illustrates an example of unnatural movement of HMD 302 relative to user 300. The HMD 302 may be the same as, or similar to, HMD 102 illustrated in FIG. 1. FIG. 3 is an exemplary illustration of the HMD 302 being removed from the user 300. Hereafter referred to as the "thief" example, consider a thief sneaking up behind user 300 and using their left hand 352 to remove HMD 302 from the user 300. The HMD 302 is removed in an upward direction relative to user 300 and data may be obtained using movement sensors 318 and 322 to determine an unnatural movement.

In some embodiments, data from the sensors 318 and 322 may be used to determine an unnatural movement. Sensors 318 and 322 may be configured to obtain information corresponding to the velocity, angular velocity, and/or acceleration of the HMD. Further, one or more of the sensors may obtain information regarding the direction the HMD is facing, moving, and/or any changes in direction of the HMD's movement. For example, sensor 318 may be an accelerometer configured to obtain data corresponding to the acceleration of the HMD when the HMD 302 is removed. Further, sensor 320 may be a digital compass configured to obtain data corresponding to the HMD's abrupt changes in direction. The movement data of the acceleration and the changes in direction of HMD 302 may be analyzed in a group to determine an unnatural movement.

In some embodiments, movement data may be compared to various thresholds to determine an unnatural movement. Referring to the "thief" example, the acceleration data may exceed a certain threshold but may not itself determine an unnatural movement. However, the number of changes in the direction of the HMD for a given time may also exceed a given threshold. Consequently, exceeding two different thresholds for a single movement may determine an unnatural movement. Although the movement data from sensors 318 and 322 may solely be relied upon to determine an unnatural movement, images from the camera 320 may also be used.

In some embodiments, camera 320 may capture images to determine an unnatural movement. Further, camera 320 may also be a video camera obtaining videos to determine an unnatural movement. Camera 320 may capture images and/or videos of thief's hand 352 removing HMD 302 to interpret an unintentional removal not caused by user 300 and determine an unnatural movement.

In some embodiments, camera 354 may obtain images and/or videos of the user's face during the removal to determine an unnatural movement characteristic of an unintentional removal. Unlike camera 320, which faces outward relative to the user's face, camera 354 may face inward towards the user's face such that images and/or videos of a user's face may be captured to determine unnatural movements. Considering the "thief" example, camera 354 may capture images and/or videos of the user's ear 338 before the thief's hand 352 removes HMD 302 from user 300. During the removal of HMD 302 from the user 300, camera 354 may capture images and/or videos that are significantly different from the user's ear 338 (e.g., images of the ground, sky, and/or other surrounding objects). Consequently, HMD 302 may determine an unnatural movement characteristic of an unintentional removal and responsively initiate a locking mechanism to secure itself.

Further, in some embodiments, camera 320 and/or 354 may reveal certain details of images taken during a removal of the HMD to determine an unnatural movement. Further, camera 320 and/or 354 may capture images reflecting an integration of an environment over periods of exposure determined by the shutter speed. In particular, camera 320 and/or 354 may capture an image of a scene over a given period of time to determine an unnatural movement characteristic of an unintentional removal. For example, considering the previous "thief" scenario, camera 320 and/or 354 may capture various details (e.g., motion blur, streaks, and/or smears) from images taken during the removal of HMD 302 to determine an unnatural movement. Yet further, consider that camera 354 is positioned to capture images of the user's nose 342. During the removal of HMD 302, camera 354 may capture an image of the user's nose 342 with characteristics of motion blur due to the movement of the HMD. The blurred image of user's nose 342 may be analyzed to indicate an unnatural movement of an unintentional removal.

D. Exemplary Methods for Locking Upon Detection of an Unauthorized Position

Figure 4:
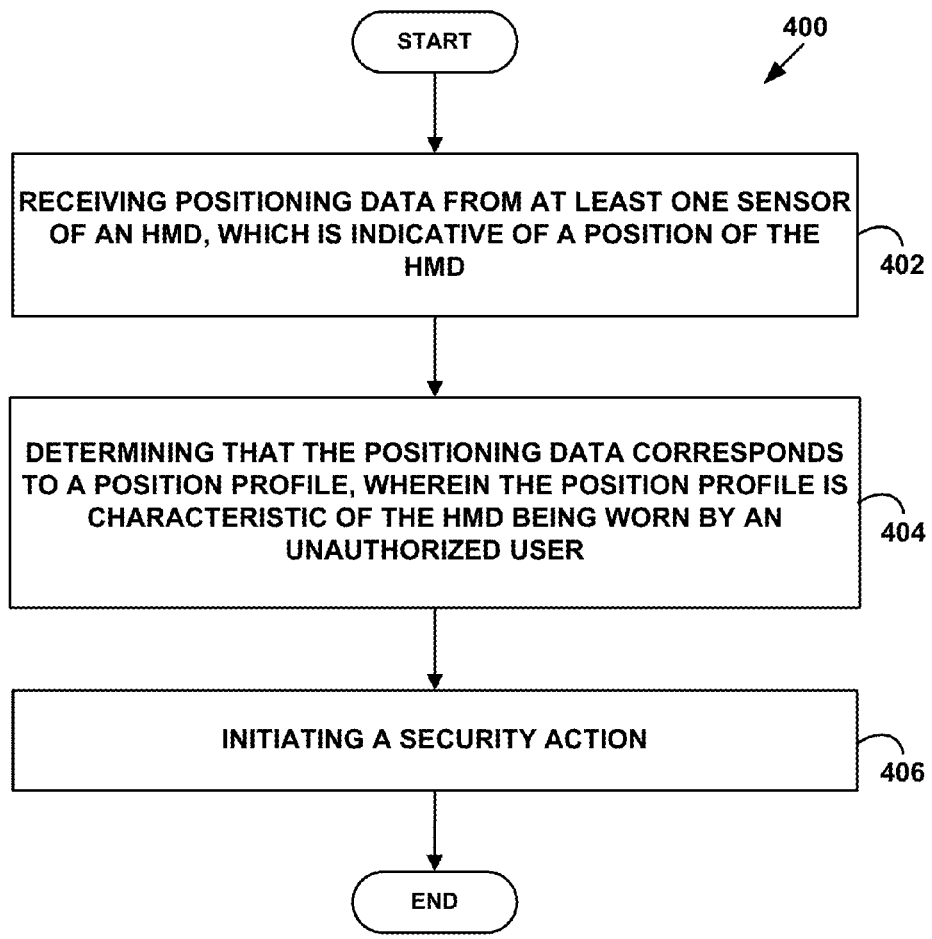
FIG. 4 is a flow chart illustrating a method for initiating an action corresponding to the HMD being worn by an unauthorized user, according to an exemplary implementation.

FIG. 4 is a flow chart illustrating an exemplary method 400. Although method 400 may be carried out by any number of computing devices or systems, method 400 is described by way of example as being carried out by a wearable computer, and in particular, by a wearable computer that includes or takes the form of an HMD.

As shown in block 402, method 400 involves a wearable computer receiving positioning data from at least one sensor of a head-mounted display (HMD), which is indicative of a position of the HMD. The wearable computer then determines that the positioning data corresponds to a position profile that is characteristic of the HMD being worn by an unauthorized user, as shown in block 404. In response, the HMD may initiate a security action to help secure the HMD, as shown by block 406. The security action may involve; e.g., locking the HMD and/or taking other actions.

i. Receiving Positioning Data

As indicated by block 402, exemplary method 400 involves receiving positioning data from at least one sensor of a head-mounted display (HMD). In some embodiments, one or more of the sensors that receive positioning data may include gyroscopes, accelerometers, cameras, shock sensors, contact sensors (e.g., capacitive sensing devices), impact sensors, location determination devices (e.g., a GPS device), magnetometers, compasses, sonar devices, and/or orientation sensors (e.g., a theodolite). These sensors may be configured to obtain various types of information regarding the positioning of the HMD. These sensors may be configured to obtain various types of information regarding the movement of an HMD characteristic of an unnatural position. In some embodiments, one or more of these sensors may obtain information corresponding to the direction the HMD is facing, any pressure exerted on parts of the HMD, and/or the position of the HMD with respect to the wearer.

In some embodiments, one or more sensors may obtain various types of information to create a user-profile unique to a user (e.g., a position profile for the user). For example, one or more sensors may obtain positioning characteristics of a user wearing the HMD, which may be custom-fitted for the user. In some embodiments, these characteristics may include the distance between the HMD and the user's face, an angle of the HMD relative to the wearer, and/or a rotation of the HMD relative to a visual plane on the user. In addition, an exemplary embodiment may have thresholds corresponding to the yaw, pitch, and azimuth of the HMD while worn by the user. The action taken to secure the HMD may vary according to which threshold or thresholds are exceeded. Furthermore, one or more sensors may capture normal and/or frequently-held positions of the HMD (possibly incorporating a user's habits) to be reflected in the user-profile. For example, a user may have a chronic neck problem and the user may routinely stretch their neck to place the HMD at an angle for several minutes during a stretch. This may be reflected in the user-profile as a normal position characteristic of the stretch.

ii. Initiating an Action Upon Detecting an Unauthorized User

As indicated by block 406, exemplary method 400 involves initiating a responsive action that corresponds to the HMD being worn by an unauthorized user, where the action secures the HMD.

In some embodiments, the responsive action may vary depending on the data pattern characteristic of the HMD being worn by an unauthorized user. For example, consider that a user's natural movements corresponding to the user's vital characteristics do not fully match a head-movement finger print in the owner's user-profile. In particular, contemplate that the user's natural tremors do not match with the natural movement patterns in the owner's user-profile. The HMD may initiate an authentication mechanism such as locking the HMD. The locking may require the user to be authenticated through iris-scanning such that the user can unlock the device and begin operating it again. In a similar example, the HMD may slightly exceed a single threshold measuring the distance between the HMD and a user according to the owner's user-profile. Similarly, this measurement may result in an action for the HMD to lock itself and simply prompt the wearer for a password to unlock the device. However, in a different example, a thief may attempt to steal the HMD from the wearer by grabbing the HMD. This movement may exceed thresholds corresponding to both an angle of the HMD relative to the wearer and a rotation of the HMD relative to a visual plane of the wearer. Both thresholds may be exceeded by large margins to cause the HMD to lock itself, sound an alarm, and notify the police regarding the location of the HMD.

iii. Detecting an Unauthorized User

As indicated by block 404, exemplary method 400 involves determining that the positioning data corresponds to an unauthorized position profile. Additionally or alternatively, an unauthorized user may be detected via analysis of movement data. For example, an HMD may also compare movement data to a "head-movement fingerprint" that identifies an authorized wearer of an HMD, in a manner such as described above.

In some embodiments, natural positioning and/or patterns of natural movements may be used to detect when an unauthorized user is wearing an HMD. For example, consider an owner of an HMD whose patterns of natural movements may be difficult to replicate such that a unique head movement fingerprint may be created for the owner. Yet further, the user-profile may be used to authenticate the owner when a user simply wears the HMD for a short period of time (i.e. less than fifteen seconds.) For instance, an owner's natural movement corresponding to their breathing pattern may be captured in a user-profile for the owner. When an unauthorized user wears the HMD, a comparison may be made between the unauthorized user's movements due to their breathing pattern versus movements indicated in the head movement fingerprint captured in the user-profile for the owner. Since the head movement fingerprint is not detected when the HMD is worn by the unauthorized user, the HMD may lock itself and prompt the user with an authentication login.

In some embodiments, an unauthorized user may be detected via an abnormal position of the HMD. (Note that in certain scenarios, it may be possible for a user to unintentionally cause their HMD to be put in an abnormal position. For example, a user may sneeze and while simultaneously moving to cover their mouth, they may inadvertently knock the HMD off the user's face, placing the HMD in an abnormal position characteristic of a removal of the HMD. This may cause the HMD to lock itself Other examples are also possible.)

In an exemplary embodiment, an HMD may analyze positioning data received to detect when the HMD is in an abnormal position, which is characteristic of being worn by an unauthorized user. For example, the HMD may analyze the direction the HMD is facing, the orientation of the HMD with respect to the wearer, and/or changes in the balance of the HMD. Further, information regarding a distance between the HMD and a wearer of the HMD, an angle of the HMD relative to the wearer, and a rotation of the HMD relative to an imaginary visual plane of the HMD may also be used to determine an abnormal position. For example, consider that the user slowly removes the HMD and gradually turns it upside down. The HMD may analyze the movement data based on gravity to detect an abnormal position and disable the device.

In some embodiments, a user-profile including positioning characteristics may also be used determine an abnormal position characteristic of being worn by an unauthorized user. A user-profile may include various positioning characteristics corresponding to a natural position of an authorized user. For example, a positioning characteristic of a user-profile may include the distance between a lens of the HMD and the user's face while comfortably wearing the HMD. Further, consider a sonar sensor in the HMD configured to measure this distance (perhaps through sampling continuously or periodically) while the user is wearing the HMD. A comparison can be made between the distance in the positioning characteristic versus the distance measured by the sonar sensor. If the sonar sensor obtains a distance that exceeds the distance in the user-profile (by a pre-determined margin or threshold), an unauthorized user may be detected.

In some embodiments, determining whether the HMD is likely being worn by another person includes detecting an abnormal position. For example, consider an unknown user (e.g., an unauthorized user) wearing an HMD belonging to an authorized user. A gyroscope in the HMD may obtain an angle of the HMD's orientation with respect to the unauthorized user and determine that the HMD is rotated compared to a normal position included in the user-profile (which is designed for the authorized user.) Further, the rotated position of the HMD may exceed an angle in the user-profile by a pre-determined margin to determine an abnormal position. Yet further, the rotated position of the HMD may be held past a period of time allowable by another threshold. Exceeding this time limit may determine an abnormal position. Other possibilities may also exist.

In some embodiments, one or more sensors may obtain data corresponding to an orientation of the HMD relative to the following: (a) a physical environment of the HMD; (b) a physical object having a known physical location; and (c) a user who is wearing the HMD. For example, consider a camera proximate to the HMD that may periodically capture images of the user's nose. A comparison may be made between the images of the user's nose and the user's nose characterized in the user-profile. This comparison may be made periodically (possibly using various sampling rates of the camera) to determine that the HMD is in a normal position. Referring back to the example of the "unknown user" above, the camera may intermittently capture images of the unknown user's nose to determine that the images differ substantially from the user's nose identified as a positioning characteristic of the user-profile. Accordingly, an abnormal position may be determined and the HMD may disable itself.

FIGS. 5a and 5b illustrate the HMD being worn by an unauthorized user, according to an exemplary implementation. HMD 502 in FIGS. 5a and 5b may be the same as, or similar to, HMD 302 illustrated in FIG. 3 and HMD 102 illustrated in FIG. 1. FIG. 5a is an exemplary illustration of HMD 502 being worn by an authorized user 500a and FIG. 5b illustrates HMD 502 being worn by an unauthorized user, 500b. HMD 502 may be custom-designed to fit user 500a and user-profile may be created for HMD 502 fitting user 500a.

In some embodiments, a visual plane of the HMD may be included as a positioning characteristic in a user-profile to determine normal positions of the HMD when worn by an authorized user. For example, consider FIG. 5a where horizontal plane 546 of HMD 502 may be included as a positioning characteristic in the user-profile for user 500a. In addition, vertical plane 550 may also be included as a positioning characteristic in the user-profile. Both horizontal plane 546 and vertical plane 550 may indicate normal positions of the HMD 502 with respect to user 500a. In some embodiments, motion sensors and position sensors may provide data for determining actual planes of the HMD. For example, sensors 518 and 522 may include gyroscopes, accelerometers, location determination devices (e.g., a GPS device), magnetometers, orientation sensors (e.g., a theodolite), sonar devices, compasses, contact sensors (e.g., capacitive sensing device), impact sensors, and/or other position sensors configured to obtain actual visual planes of the HMD 502 with respect to a user. Camera 520 may also be used as well to determine actual planes. Yet further, camera 520 and sensors 518 and 522 may obtain data individually and/or obtain data collectively to determine actual planes. Other possibilities may exist.

In some embodiments, a positioning characteristic in a default user-profile may be used to determine when an abnormal position is substantially different from at least one natural position characteristic of a movement of the HMD. In particular of these embodiments, actual planes (possibly defined as positioning characteristics) may be compared with planes included in user-profiles to determine abnormal positions. For example, when HMD 502 are worn by user 500a, actual horizontal plane 544 and vertical plane 548 aligns with horizontal plane 546 and vertical plane 550 included in the default user-profile, respectively. Therefore, a normal position is determined in FIG. 5a. However, when HMD 502 are worn by user 500b as shown in FIG. 5b, horizontal plane 544 does not align with horizontal plane 546 defined in the default user-profile. Similarly, vertical plane 548 does not align with vertical plane 550. Yet further, the misalignments may exceed a certain threshold defined as a positioning characteristic included in the default user-profile to indicate a substantially different position. For example, consider a default user-profile including a positioning characteristic such that angle 552 has a threshold of 5 degrees (as shown in FIG. 5b.) Since angle 552 may exceed the threshold of 5 degrees when HMD 502 is worn by user 500b, an abnormal position substantially different from a normal position may be determined. In some embodiments, the misalignments may be held for a period of time exceeding certain thresholds of time also indicated in the user-profile. Considering the previous example, the threshold of 5 degrees may need to be exceeded for 5 consecutive minutes to indicate a substantially different position. In response to determining an abnormal position substantially different from a normal position as described in any of the examples above, HMD 502 may initiate a security mechanism to inform security personnel that the HMD 502 are not worn by an authorized user.

In some embodiments, substantially different positions may be determined by a default user profile created based on average and/or typical movements of a human's head and/or body. For example, considering FIG. 5, a default user-profile for user 500a may include a threshold of 5 degrees for angle 552 based on average human movements and/or thresholds typically used. In some embodiments, a substantially different position may be determined by a user-profile custom-designed for a certain user. For example, consider a user-profile custom-designed for user 500a which includes a threshold indicating a position that is substantially different when angle 552 is greater than or equal to 3 degrees. When the HMD rotates such that angle 552 is greater than or equal to 3 degrees, the HMD may determine a substantially different position and initiate a locking mechanism to prompt the user with an authentication login. In some embodiments, angle 552 may be adjusted by the user to define a position that is substantially different. For example, the threshold for angle 552 may be adjusted to 1 degree (possibly by the user) to indicate a position that is substantially different from a normal position.

In some embodiments, a positioning characteristic in a user-profile may be disabled to prevent the determination of an abnormal position that is substantially different from a normal position. For example, considering the scenario above, the user may disable the positioning characteristic for angle 552 such that HMD 502 may rotate beyond the threshold of 3 degrees. Furthermore, other positioning characteristics in a user-profile may be disabled such that HMD 502 can be worn by user 500b without indicating a substantially different position.

E. Determining an Unauthorized User Relative to Physical Objects

FIGS. 6a and 6b illustrate an unauthorized user of an HMD relative to physical objects, according to an exemplary implementation. HMD 602 in FIGS. 6a and 6b may be the same or similar to HMD 502 illustrated in FIGS. 5a and 5b. In addition, user 600a and 600b may be the same as or similar to users as 500a and 500b, respectively. HMD 602 may be custom-designed to fit user 600a.

In some embodiments, abnormal positions may be determined with the use of a camera capturing the orientation of an HMD with respect to physical objects. For example, FIG. 6a illustrates HMD 602 being worn by a user 600a and FIG. 6b illustrates HMD 602 being worn by a different user, 600b. FIGS. 6a and 6b illustrate two different positions of the HMD 602 with respect to two different users. In addition, FIGS. 6a and 6b show differences between images 659 and 660 captured by a camera 620 during two different instances. (FIG. 6a illustrates image 659 taken by camera 620 when HMD 602 is worn by user 600a and FIG. 6b shows image 660 taken by camera 620 when HMD 602 is worn by user 600b.) It may be determined that the differences between image 659 and 660, namely the orientation of HMD 602 with respect to laptop 654 and cell phone 655, is a result of an abnormal position. This determination may initiate an action to lock HMD 602 such that user 600b is unable to access HMD 602.

For example, consider a scenario in FIG. 6a where the user 600a is sitting at a desk in their office wearing HMD 602 in front of user 600a's laptop computer 654 and cell phone 655. The camera 620 captures an image 659 of the laptop computer 654 and cell phone 655. Subsequently, user 600a leaves the office whereupon user 600a is followed by user 600b. Consider that user 600b is a spy trying to obtain information from laptop computer 654. Therefore, contemplate that user 600b sneaks behind user 600a, removes HMD 602 from user 600a, and sedates user 600a to successfully obtain possession HMD 602. In some embodiments, sensors 618 and 622 may obtain movement data that determines an abnormal movement of the HMD 602, which may be a characteristic of an unintentional removal of HMD 602. In some embodiments, sensors 618 and 622 may obtain position data that determines a position of HMD 602 that is substantially different from at least one normal position of the HMD, where the normal positions may be indicated by a user-profile for user 600a. In some embodiments, the abnormal position may be characteristic of an unintentional removal of the HMD from a wearer.

However, for the purposes of illustration, consider the example above while ignoring any abnormal movement or position that may be detected when user 600b obtains possession of HMD 602. Instead, contemplate that user 600b, while wearing HMD 602, returns to the desk in the office where user 600a was previously wearing HMD 602. User 600b, while trying to obtain information from laptop computer 654, looks in the same direction that user 600a was looking previously. Therefore, camera 620 is situated to capture image 660 which includes laptop computer 654 and cell phone 655 (similar to when image 659 was taken when HMD 602 was worn by user 600a.) However, user 600b may have physical characteristics that differ from user 600a (e.g., user 600b may be taller than user 600a.) Further, user 600b may have a different facial and/or head structure than user 600a such that the position of the HMD 602 rotates slightly as shown in FIG. 6b (possibly similar to the illustration of HMD 502 in FIG. 5b compared to FIG. 5a.) It may be recognized that laptop 654 has shifted from its original position 657 by the same degree that cell phone 655 has shifted from its original position 658. Since both laptop 654 and cell phone 655 have moved together and by the same (or similar) angle, it may be determined that neither laptop 654 nor cell phone 655 have moved independently. Instead, it may be determined that there has been a change in an orientation of HMD 602 with respect to physical objects in the vicinity. Recognizing this change, an abnormal position of HMD 602 may be determined. In some embodiments, the change in orientation may exceed a time period pre-defined in a user-profile for user 600a to determine an abnormal position. In some embodiments, the position of HMD 602 may be substantially different from at least one normal position of the HMD, where the normal positions may be indicated by a user-profile for user 600a. In some embodiments, the abnormal position may be characteristic of an unintentional removal of the HMD from a wearer.

It should be understood that the camera 620 may capture images of other objects in the physical environment proximate to the user 600 to determine the orientation or changes in the orientation of surrounding objects. For example, the camera 620 may be positioned in other regions of the HMD 602 to capture different images. In some embodiments, camera 620 may be positioned such that it captures images of the user's face. In addition, camera 620 may be positioned to capture images of other people proximate to the user. In some embodiments, HMD 602 may have multiple cameras capturing various images of the physical environment proximate to the user.

F. Movements and/or Positions of an HMD

Figure 7A:
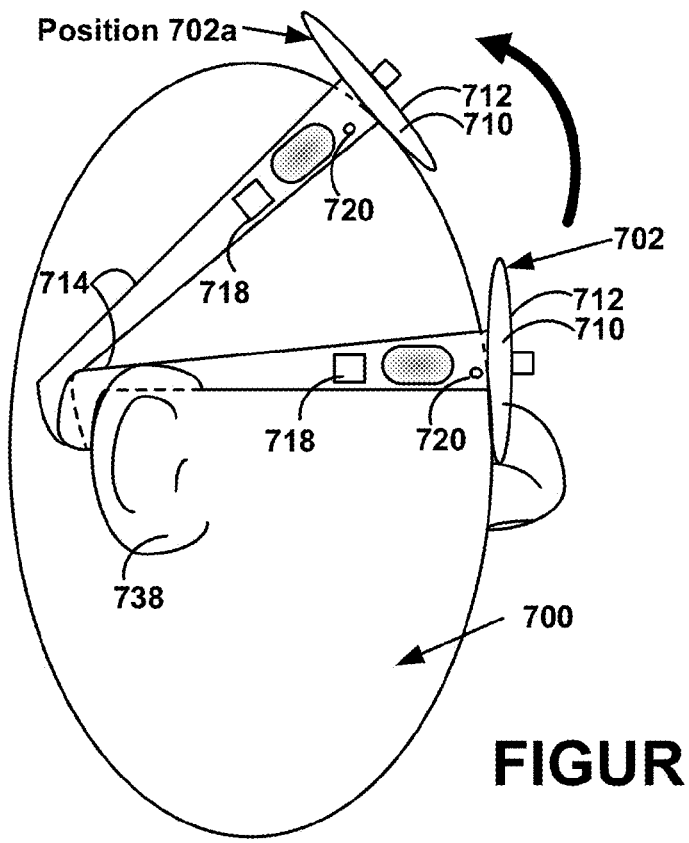
FIGS. 7a and 7b illustrate movements and/or positions of an HMD, according to exemplary implementations.
Figure 7B:
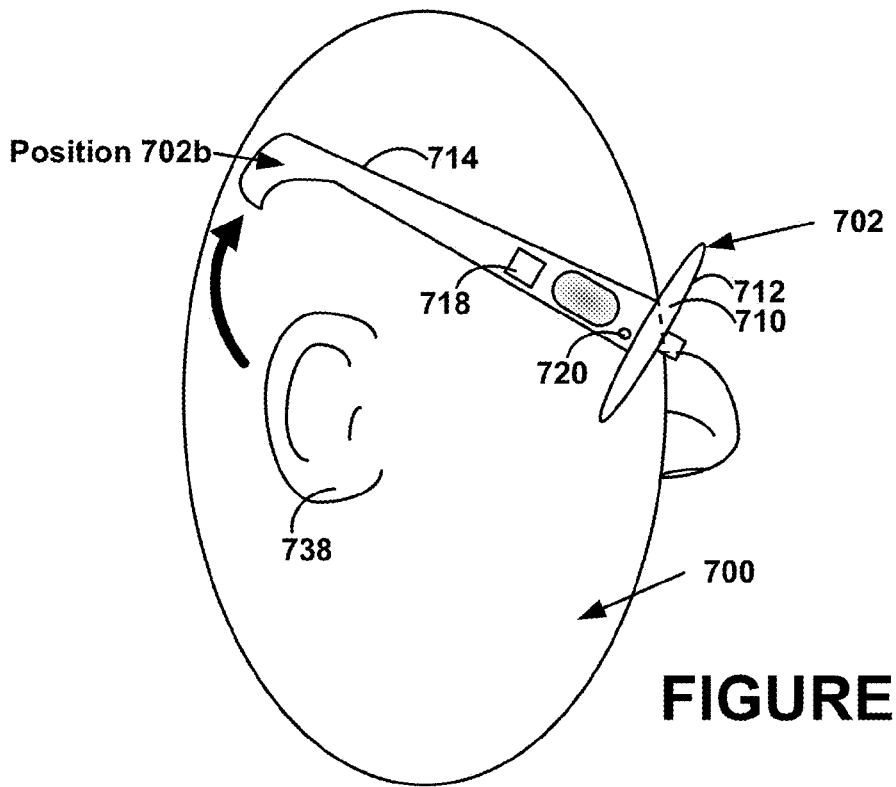

FIGS. 7a and 7b illustrate movements and/or positions an HMD, according to exemplary implementations. Further, HMD 702 may be an HMD worn by user 700. In FIG. 7a, HMD 702 is moved to position 702a such that lens elements 710 and 712 are raised above a normal position of the HMD whereas extending side-arm 114 pivots behind the user's ear 738. Sensor 718 may determine this movement to be a typical movement. In addition, camera 720 may capture images to determine that the position of the HMD is in a normal position. Furthermore, camera 720 may capture images determining that position 702a has equivalent or close positioning characteristics as what is provided in the user-profile indicating a normal position. For example, camera 720 may capture that extending side-arm 714 is within a pre-defined distance from the user's ear 738 to determine that HMD 702 is in a normal position. In some embodiments, this position may be held indefinitely without determining an abnormal position.

In FIG. 7b, extending side-arm 714 is raised above the user's ear 738. In some embodiments, sensor 718 may determine this movement to be a normal movement. However, camera 720 may capture images indicating an abnormal position. Referring back to the example above, the pre-defined the distance between side-arm 714 and user's ear 738 may be exceeded. Therefore, although a normal movement may be determined, it may be determined that position 702b is an abnormal position. Furthermore, the HMD 702 may initiate a locking mechanism. Other possibilities and combinations may exist.

H. Exemplary Wearable Computing Device

In accordance with an example embodiment, a wearable computing system may comprise various components, including one or more processors, one or more forms of memory, one or more sensor devices, one or more I/O devices, one or more communication devices and interfaces, and a head-mounted display (HMD), all collectively arranged in a manner to make the system wearable by a user. The wearable computing system may also include machine-language logic (e.g., software, firmware, and/or hardware instructions) stored in one or another form of memory and executable by one or another processor of the system in order to implement one or more programs, tasks, applications, or the like. The wearable computing system may be configured in various form factors, including, without limitation, integrated in the HMD as a unified package, or distributed, with one or more elements integrated in the HMD and one or more others separately wearable (e.g., as a garment, in a garment pocket, as jewelry, etc.).

Although described above as a component of a wearable computing system, it is sometimes convenient to consider an HMD to be (or at least to represent) the wearable computing system. Accordingly, unless otherwise specified, the terms "wearable head-mounted display" (or "wearable HMD") or just "head-mounted display" (or "HMD") will be used herein to refer to a wearable computing system, in either an integrated (unified package) form, a distributed (or partially distributed) form, or other wearable form.

FIG. 8a illustrates an example wearable computing system 800 for receiving, transmitting, and displaying data. In accordance with an example embodiment, the wearable computing system 800 is depicted as a wearable HMD taking the form of HMD 802. However, it will be appreciated that other types of wearable computing devices could additionally or alternatively be used.

As illustrated in FIG. 8a, the HMD 802 comprise frame elements including lens-frames 804 and 806 and a center frame support 808, lens elements 810 and 812, and extending side-arms 814 and 816. The center frame support 808 and the extending side-arms 814 and 816 are configured to secure the HMD 802 to a user's face via a user's nose and ears, respectively. Each of the frame elements 804, 806, and 808 and the extending side-arms 814 and 816 may be formed of a solid structure of plastic or metal, or may be formed of a hollow structure of similar material so as to allow wiring and component interconnects to be internally routed through the HMD 802. Each of the lens elements 810 and 812 may include a material on which an image or graphic can be displayed. Each of the lens elements 810 and 812 may also be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 814 and 816 are each projections that extend away from the frame elements 804 and 806, respectively, and are positioned behind a user's ears to secure the HMD 802 to the user. The extending side-arms 814 and 816 may further secure the HMD 802 to the user by extending around a rear portion of the user's head. Additionally or alternatively, the wearable computing system 800 may be connected to or be integral to a head-mounted helmet structure. Other possibilities exist as well.

The wearable computing system 800 may also include an on-board computing system 818, a video camera 820, a sensor 822, a finger-operable touch pad 824, and a communication interface 826. The on-board computing system 818 is shown to be positioned on the extending side-arm 814 of the HMD 802; however, the on-board computing system 818 may be provided on other parts of the HMD 802. The on-board computing system 818 may include a one or more processors and one or more forms of memory, for example. One or more processors may execute instructions stored on some form of non-transitory tangible computer readable storage medium, such as magnetic or optical disk, or the like, and provided for transfer to the wearable head-mounted display's memory during configuration or other procedure(s). The on-board computing system 818 may be configured to receive and analyze data from the video camera 820, the finger-operable touch pad 824, and the wireless communication interface 826 (and possibly from other sensory devices, user interfaces, or both) and generate images for output to the lens elements 810 and 812.

The video camera 820 is shown to be positioned on the extending side-arm 814 of the HMD 802; however, the video camera 820 may be provided on other parts of the HMD 802. The video camera 820 may be configured to capture images at various resolutions or at different frame rates. Many video cameras with a small form factor, such as those used in cell phones or webcams, for example, may be incorporated into an example of the wearable system 800. Although FIG. 8a illustrates one video camera 820, more video cameras may be used, and each may be configured to capture the same view, or to capture different views. For example, the video camera 820 may be forward facing to capture at least a portion of the real-world view perceived by the user. This forward facing image captured by the video camera 820 may then be used to generate an augmented reality where computer generated images appear to interact with the real-world view perceived by the user.

The sensor 822 is shown mounted on the extending side-arm 816 of the HMD 802; however, the sensor 822 may be provided on other parts of the HMD 802. Although depicted as a single component, the sensor 822 in FIG. 8a could include more than one type of sensor device or element. By way of example and without limitation, the sensor 822 could be any one or more of a motion detector (e.g., a gyroscope and/or an accelerometer), a location determination device (e.g., a GPS device), a magnetometer, and an orientation sensor (e.g., a theodolite). Other sensing devices or elements may be included within the sensor 822 and other sensing functions may be performed by the sensor 822.

The finger-operable touch pad 824, shown mounted on the extending side-arm 814 of the HMD 802, may be used by a user to input commands. The finger-operable touch pad 824 may sense at least one of a position and a movement of a finger via capacitive sensing, resistance sensing, or a surface acoustic wave process, among other possibilities. The finger-operable touch pad 824 may be capable of sensing finger movement in a direction parallel to the pad surface, in a direction normal to the pad surface, or both, and may also be capable of sensing a level of pressure applied. The finger-operable touch pad 824 may be formed of one or more translucent or transparent insulating layers and one or more translucent or transparent conducting layers. Edges of the finger-operable touch pad 824 may be formed to have a raised, indented, or roughened surface, so as to provide tactile feedback to a user when the user's finger reaches the edge of the finger-operable touch pad 824. Although not shown in FIG. 8*a*, the HMD 802 could include one more additional the finger-operable touch pads, for example attached to the extending side-arm 816, and could be operated independently of the finger-operable touch pad 824 to provide a duplicate and/or different function.

The communication interface 826 could include an antenna and transceiver device for support of wireline and/or wireless communications between the wearable computing system 800 and a remote device or communication network. For instance, the communication interface 826 could support wireless communications with any or all of 3G and/or 4G cellular radio technologies (e.g., CDMA, EVDO, GSM, UMTS, LTE, WiMAX), as well as wireless area network technologies such as a Bluetooth and WiFi (e.g., 802.11a, 802.11b, 802.11g). Other types of wireless access technologies could be supported as well. The communication interface 826 could enable communications between the wearable computing system 800 and one or more end devices, such as another wireless communication device (e.g., a cellular phone or another wearable computing device), a user at a computer in a communication network, or a server or server system in a communication network. The communication interface 826 could also support wired access communications with Ethernet or USB connections, for example.

FIG. 8*b* illustrates another view of the wearable computing system 800 of FIG. 8*a*. As shown in FIG. 8*b*, the lens elements 810 and 812 may act as display elements. The HMD 802 may include a first projector 828 coupled to an inside surface of the extending side-arm 816 and configured to project a display image 832 onto an inside surface of the lens element 812. Additionally or alternatively, a second projector 830 may be coupled to an inside surface of the extending side-arm 814 and configured to project a display image 834 onto an inside surface of the lens element 810.

The lens elements 810 and 812 may act as a combiner in a light projection system and may include a coating that reflects the light projected onto them from the projectors 828 and 830. In some embodiments, a special coating may not be used (e.g., when the projectors 828 and 830 are scanning laser devices).

Since the lens elements 810 and 812 are transparent, a forward viewing field may be seen concurrently with projected or displayed images (such as display images 832 and 834). This is represent in FIG. 8*b* by the field of view (FOV) object 836-L in the left lens element 812 and the same FOV object 836-R in the right lens element 810. The combination of displayed images and real objects observed in the FOV may be one aspect of augmented reality, referenced above.

In alternative embodiments, other types of display elements may also be used. For example, the lens elements 810, 812 themselves may include: a transparent or semi-transparent matrix display, such as an electroluminescent display or a liquid crystal display; one or more waveguides for delivering an image to the user's eyes; and/or other optical elements capable of delivering an in focus near-to-eye image to the user. A corresponding display driver may be disposed within the frame elements 804 and 806 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

Although not shown in FIGS. 8*a* and 8*b*, the wearable system 800 can also include one or more components for audio output. For example, wearable computing system 800 can be equipped with speaker(s), earphone(s), and/or earphone jack(s). Other possibilities exist as well.

While the wearable computing system 800 of the example embodiment illustrated in FIGS. 8*a* and 8*b* is configured as a unified package, integrated in the HMD component, other configurations are possible as well. For example, although not explicitly shown in FIGS. 8*a* and 8*b*, the computing system 800 could be implemented in a distributed architecture in which all or part of the on-board computing system 818 configured remotely from the HMD 802 and made wearable in or on clothing as an accessory (e.g., in a garment pocket or on a belt clip). Similarly, various other (though not necessarily all other) components depicted in FIGS. 8*a* and/or 8*b* as integrated in the HMD 802 could also be configured remotely from the HMD component. In such a distributed architecture, certain components might still be integrated in HMD component. For instance, several of the one or more sensors (e.g., an accelerometer and/or an orientation sensor) could be integrated in HMD 802.

In an example distributed configuration, the HMD component (including other integrated components) could communicate with remote components over via the communication interface 826 (or via a dedicated connection, distinct from the communication interface 826). By way of example, a wired (e.g. USB or Ethernet) or wireless (e.g., WiFi or Bluetooth) connection could support communications between a remote computing system and a HMD component. Additionally, such a communication link could be implemented between a HMD component and other remote devices, such as a laptop computer or a mobile telephone, for instance.

Figure 9:
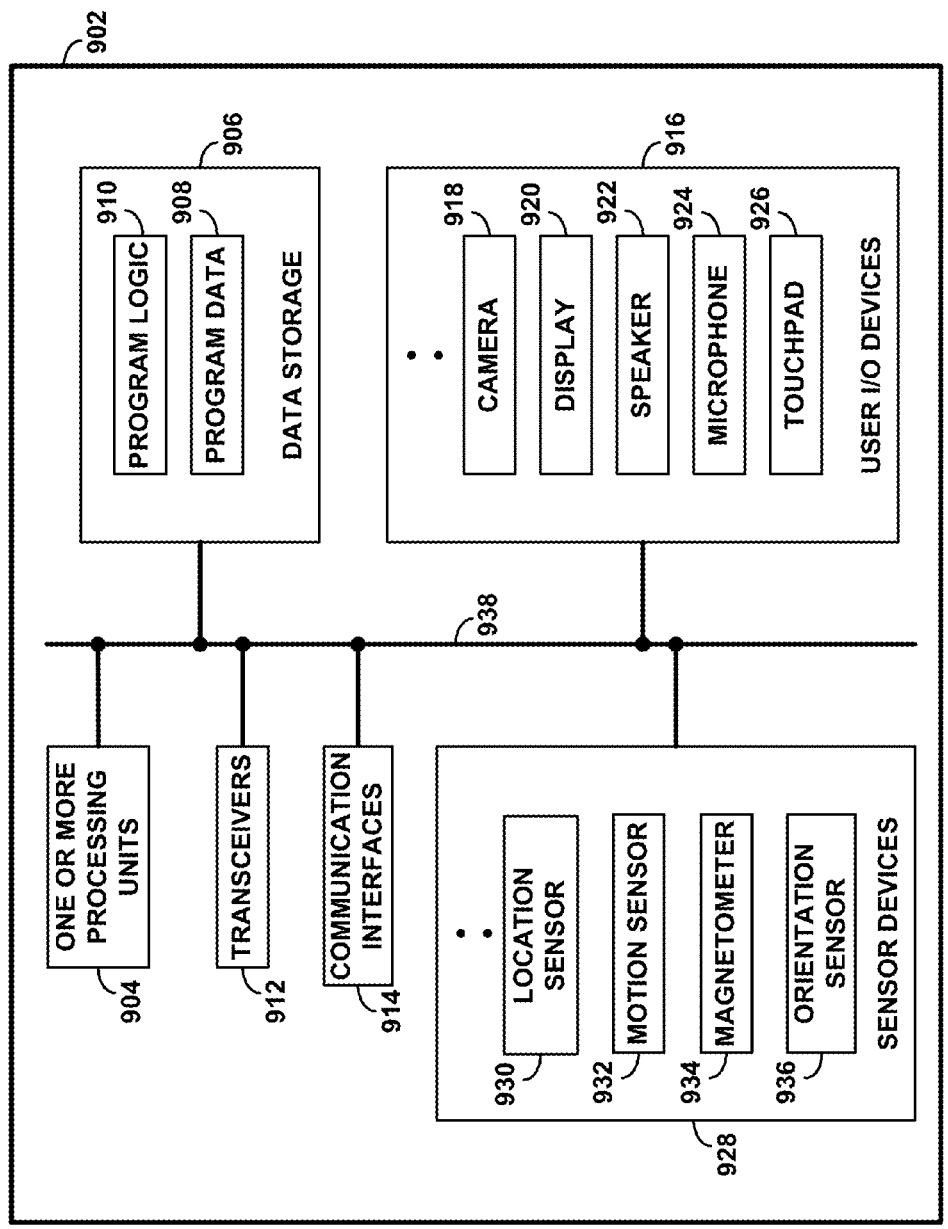
FIG. 9 is a functional block diagram of a wearable computing system, according to an exemplary implementation.

FIG. 9 is a block diagram depicting functional components of an example wearable computing system 902 in accordance with an example embodiment. As shown in FIG. 9, the example wearable computing system 902 includes one or more processing units 904, data storage 906, transceivers 912, communication interfaces 914, user I/O devices 916, and sensor devices 928, all of which may be coupled together by a system bus 938 or other communicative interconnection means. These components may be arranged to support operation in accordance with an example embodiment of a wearable computing system, such as system 100 shown in FIGS. 1*a* and 1*b*, or other a wearable HMD.

The one or more processing units 904 could include one or more general-purpose processors (e.g., microprocessors) and/or one or more special-purpose processors (e.g., dedicated digital signal processor, application specific integrated circuit, etc.). In turn, the data storage 906 could include one or more volatile and/or non-volatile storage components, such as magnetic or optical memory or disk storage. Data storage 906 can be integrated in whole or in part with processing unit 904, as cache memory or registers for instance. As further shown, data storage 906 is equipped to hold program logic 908 and program data 910.

Program logic 908 could include machine language instructions (e.g., software code, firmware code, etc.) that define routines executable by the one or more processing units 904 to carry out various functions described herein. Program data 910 could contain data used or manipulated by one or more applications or programs executable by the one or more processors. Such data can include, among other forms of data, program-specific data, user data, input/output data, sensor data, or other data and information received, stored, retrieved, transmitted, analyzed, or modified in the course of execution of one or more programs or applications.

The transceivers 912 and communication interfaces 914 may be configured to support communication between the wearable computing system 902 and one or more end devices, such as another wireless communication device (e.g., a cellular phone or another wearable computing device), a user at a computer in a communication network, or a server or server system in a communication network. The transceivers 912 may be coupled with one or more antennas to enable wireless communications such those describe above in connection with the wireless communication interface 826 shown in FIG. 8a. The transceivers 912 may also be coupled with one or more and wireline connectors for wireline communications such as Ethernet or USB. The transceivers 912 and communication interfaces 914 could also be used support communications within a distributed-architecture in which various components of the wearable computing system 902 are located remotely from one another. In this sense, the system bus 938 could include elements and/or segments that support communication between such distributed components.

As shown, the user I/O devices 916 include a camera 918, a display 920, a speaker 922, a microphone 924, and a touchpad 926. The camera 918 could correspond to the video camera 820 described in the discussion of FIG. 8a above. Similarly, the display 920 could correspond to an image processing and display system for making images viewable to a user (wearer) of an HMD. The display 920 could include, among other elements, the first and second projectors 828 and 830 coupled with lens elements 812 and 810, respectively, for generating images displays as described in the discussion of FIG. 8b above. The touchpad 226 could correspond to the finger-operable touch pad 824, also described in the discussion of FIG. 8a above. The speaker 922 and microphone 924 could similarly correspond to components referenced in the discussion above of FIGS. 8a and 8b. Each of the user I/O devices 916 could also include a device controller and stored, executable logic instructions, as well as an interface for communication via the system bus 938.

The sensor devices 928, which could correspond to the sensor 822 described in the discussion of FIG. 8a, include a location sensor 930, a motion sensor 932, a magnetometer 934, and an orientation sensor 936. The location sensor 930 could correspond to a Global Positioning System (GPS) device, or other location-determination device (e.g. mobile phone system triangulation device, etc.). The motion sensor 932 could correspond to an accelerometer or one or more gyroscopes.

The orientation sensor could include a theodolite for determining an angular orientation of a reference pointing direction of the HMD with respect to a local terrestrial coordinate system. For instance, the orientation sensor could determine an altitude angle with respect to horizontal and an azimuth angle with respect to geographic (or geodetic) North of a forward pointing direction of the HMD. Other angles and coordinate systems could be used as well for determining orientation.

The magnetometer could be used to determine the strength and direction of the Earth magnetic (geomagnetic) field as measured at a current location of the HMD. The magnetometer could be used as a compass, possibly in conjunction with the orientation sensor for determining the azimuth angle.

Each of the sensor devices 928 could also include a device controller and stored, executable logic instructions, as well as an interface for communication via the system bus 938.

It will be appreciated that there can be numerous specific implementations of a wearable computing system or wearable HMD, such the wearable computing system 902 illustrated in FIG. 9. Further, one of skill in the art would understand how to devise and build such an implementation.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

I claim:

1. A computer-implemented method comprising:
    determining one or more thresholds indicated by a wearer-profile;
    receiving movement data from at least one sensor of a head-mountable display (HMD), wherein the movement data corresponds to movement of the HMD;
    determining that the movement data corresponds to movement exceeding the one or more thresholds, wherein exceeding the one or more thresholds is indicative of (a) a removal of the HMD and (b) the removal of the HMD being unintentional; and
    in response to determining that the movement data corresponds to exceeding the one or more thresholds, initiating a security action.

2. The method of claim 1, wherein exceeding the one or more thresholds is indicative of a physical separation between the HMD and the wearer.

3. The method of claim 1, wherein exceeding the one or more thresholds is indicative of a movement of the HMD that is not caused by the wearer of the HMD.

4. The method of claim 1, wherein initiating the security action comprises notifying authorities as to the removal of the HMD and the removal of the HMD being unintentional.

5. The method of claim 1, wherein determining that the movement data corresponds to movement exceeding the one or more thresholds comprises:
    determining one or more of the following movement indicators: (a) velocity of the HMD; (b) angular velocity of the HMD; and (c) acceleration of the HMD; and
    using the one or more movement indicators as a basis for determining that the movement data corresponds to movement exceeding the one or more thresholds.

6. The method of claim 5, wherein determining that the movement data corresponds to movement exceeding the one or more thresholds comprises determining that one or more of the movement indicators exceeds a respective threshold.

7. The method of claim 5, wherein initiating the security action comprises initiating one or more of the following actions: (a) locking the HMD, (b) disabling the HMD, and (c) sounding an alarm.

8. The method of claim 1, wherein exceeding the one or more thresholds is indicative of the HMD being worn by an unauthorized user.

9. The method of claim 8, wherein determining that the movement data corresponds to movement exceeding the one or more thresholds comprises:
   comparing the movement data to the one or more thresholds indicated by the wearer-profile, wherein the wearer-profile is one of one or more authorized profiles associated with the HMD; and
   responsive to a substantial mismatch between the movement data and the one or more thresholds, determining that the HMD is being worn by an unauthorized user.

10. The method of claim 9, wherein each of the one or more authorized profiles comprises a head-movement fingerprint, and wherein the head-movement fingerprint corresponds to movements based on one or more breathing patterns.

11. A wearable-computing system comprising:
   a non-transitory computer-readable medium; and
   program instructions stored on the non-transitory computer-readable medium and executable by at least one processor to:
      determine one or more thresholds indicated by a wearer-profile;
      receive movement data from at least one sensor of a head-mounted display (HMD), wherein the movement data corresponds to movement of the HMD;
      determine that the movement data corresponds to movement exceeding the one or more thresholds, wherein exceeding the one or more thresholds is indicative of (a) a removal of the HMD and (b) the removal of the HMD being unintentional; and
      in response to determining that the movement data corresponds to exceeding the one or more thresholds, initiate a security action.

12. The system of claim 11, wherein the movement data is received from at least one of: (a) an accelerometer; (b) a gyroscope; and (c) a shock sensor.

13. The system of claim 11, wherein the wearer-profile comprises one or more movement indicators, wherein the one or more movement indicators comprise one or more of the following: (a) velocity of the HMD, (b) angular velocity of the HMD, (c) acceleration of the HMD, (d) a direction of movement of the HMD, (e) a change in direction of the movement of the HMD, and (f) an acceleration of the HMD.

14. The system of claim 11, wherein the security action comprises one or more of the following operations: (a) locking the HMD, (b) disabling the HMD, and (c) sounding an alarm.

15. A non-transitory computer readable medium having stored therein instructions executable by a client computing device to cause the client computing device to perform functions comprising:
   determining one or more thresholds indicated by a wearer-profile;
   receiving movement data from at least one sensor of a head-mounted display (HMD), wherein the movement data corresponds to movement of the HMD;
   determining that the movement data corresponds to movement exceeding the one or more thresholds, wherein exceeding the one or more thresholds is indicative of (a) a removal of the HMD and (b) the removal of the HMD being unintentional; and
   in response to determining that the movement data corresponds to exceeding the one or more thresholds, initiating a security action.

16. The non-transitory computer readable medium of claim 15, wherein the wearer-profile comprises one or more movement indicators, wherein the one or more movement indicators comprise one or more of the following: (a) velocity of the HMD, (b) angular velocity of the HMD, (c) acceleration of the HMD, (d) a direction of movement of the HMD, (e) a change in direction of the movement of the HMD, and (f) an acceleration of the HMD.

17. The non-transitory computer readable medium of claim 15, wherein the security action comprises one or more of the following operations: (a) locking the HMD, (b) disabling the HMD, and (c) sounding an alarm.

18. A computer-implemented method comprising:
   determining one or more thresholds indicated by a wearer-profile;
   receiving positioning data from at least one sensor of a head-mounted display (HMD), wherein the positioning data is indicative of a position of the HMD;
   determining that the positioning data corresponds to the position exceeding the one or more thresholds, wherein exceeding the one or more thresholds is indicative of the HMD being worn by an unauthorized user, and wherein determining that the position data corresponds to the position exceeding the one or more thresholds comprises:
      comparing the positioning data to the one or more thresholds indicated by the wearer-profile, wherein the wearer-profile is one of one or more authorized position profiles associated with the HMD; and
      responsive to determining a substantial mismatch between the positioning data and the one or more thresholds, determining that the HMD is being worn by an unauthorized user; and
   in response to determining that the position data corresponds to exceeding the one or more thresholds, initiating a security action.

19. The method of claim 18, wherein initiating the security action comprises notifying authorities that the HMD is potentially being worn by the unauthorized user.

20. The method of claim 18, further comprising:
   receiving movement data from at least one sensor of the HMD, wherein the movement data corresponds to movement of the HMD; and
   conditioning the initiating of the security action upon determining a substantial mismatch between the movement data and one or more authorized movement profiles indicated by one or more wearer-profiles that are associated with the HMD, in addition to determining the substantial mismatch between the positioning data and the one or more thresholds.

21. The method of claim 18, wherein the security action comprises one or more of the following operations: (a) locking the HMD, (b) disabling the HMD, and (c) sounding an alarm.

* * * * *